G. A. BURNHAM.
SELECTIVE TIME LIMIT CONTROLLING DEVICE FOR ELECTRIC SWITCHES.
APPLICATION FILED NOV. 19, 1914.

1,288,501.

Patented Dec. 24, 1918.
2 SHEETS—SHEET 1.

Witnesses:
H. B. Davis
L. L. Erickson

Inventor:
George A. Burnham
by Hays & Harriman
Attys

G. A. BURNHAM.
SELECTIVE TIME LIMIT CONTROLLING DEVICE FOR ELECTRIC SWITCHES.
APPLICATION FILED NOV. 19, 1914.

1,288,501.

Patented Dec. 24, 1918.
2 SHEETS—SHEET 2.

UNITED STATES PATENT OFFICE.

GEORGE A. BURNHAM, OF SAUGUS, MASSACHUSETTS, ASSIGNOR TO SEARS B. CONDIT, JR., OF BROOKLINE, MASSACHUSETTS.

SELECTIVE TIME-LIMIT CONTROLLING DEVICE FOR ELECTRIC SWITCHES.

1,288,501.            Specification of Letters Patent.            Patented Dec. 24, 1918.

Original application filed July 21, 1911, Serial No. 639,763. Divided and this application filed November 19, 1914. Serial No. 873,062.

*To all whom it may concern:*

Be it known that I, GEORGE A. BURNHAM, a citizen of the United States, residing at Saugus, in the county of Essex and State of Massachusetts, have invented an Improvement in Selective Time-Limit Controlling Devices for Electric Switches, of which the following is a specification.

This invention relates to selective time-limit controlling-devices for electric-switches, and is a division of my application filed July 21, 1911, Serial No. 639,763. The invention has for its object the construction of a time-limit controlling-device having switch operating-means requiring a prolonged period of time to operate the switch, including contact-members, means controlled by an overload current to adjust one of said members to variably reduce said period of time according to the current value of the overload up to a predetermined current value, and to definitely reduce said period of time on overloads of higher current value, and means controlled by an overload current and actuated at a constant speed to operate the other member. In the present embodiment of my invention the switch operating-means comprises a controller for the switch, such as an electro-magnet, and an operating-device for said controller, such as a circuit-closer for the circuit of said electro-magnet, and both members of the circuit-closer, here referred to as contact-members, are movable toward and from each other, movement of one member being automatically controlled by the overload current to vary its position with respect to the other member, thereby to variably reduce the interval of space and correspondingly variably reduce the time required for the members to engage and close the circuit of the controller to operate the switch. The automatic controlling-means may consist of a solenoid to the armature or core of which said movable contact-member is connected, and said solenoid operates to move said contact-member variable distances according to the current value of overloads up to a predetermined current value, and to move said contact-member definite distances on overloads of higher current values, so that on light overloads said contact-member will be moved variable distances, and on heavy overloads will be moved its full distance, which is definite or the same for all heavy overloads. The means, here shown, which is controlled by the overload current to operate the other contact-member may consist of an electric-motor arranged to be controlled by the overload current and to be operated by an independent source of energy, and its speed is constant regardless of the current value of the overload.

Figure 1:
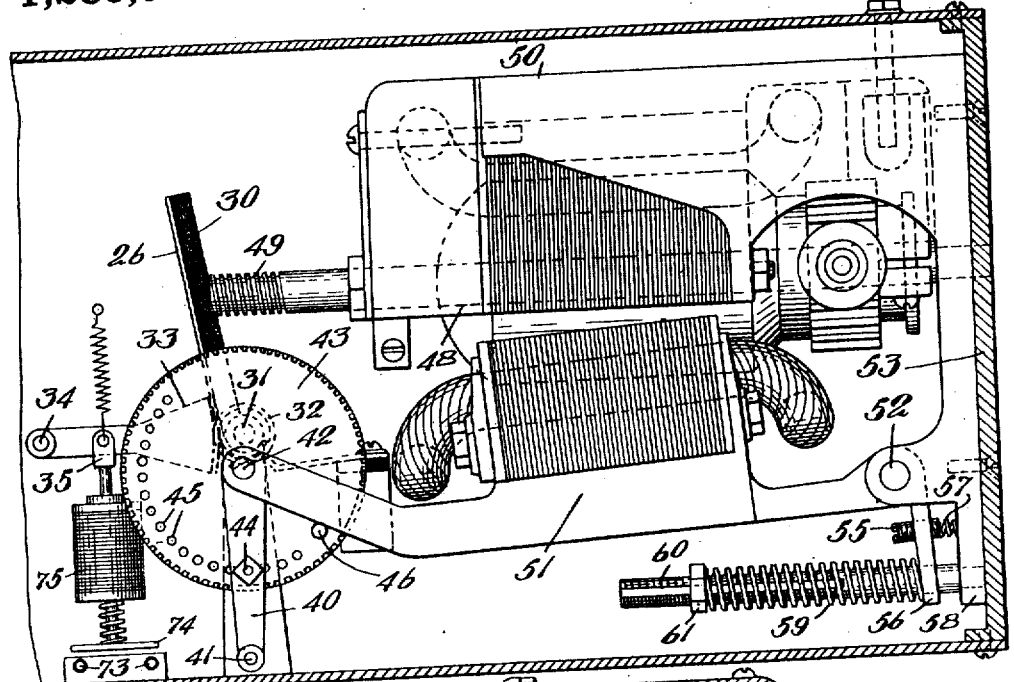
Figure 1, is a side elevation of a time-limit controlling-device for electric-switches embodying this invention.
Figure 2:
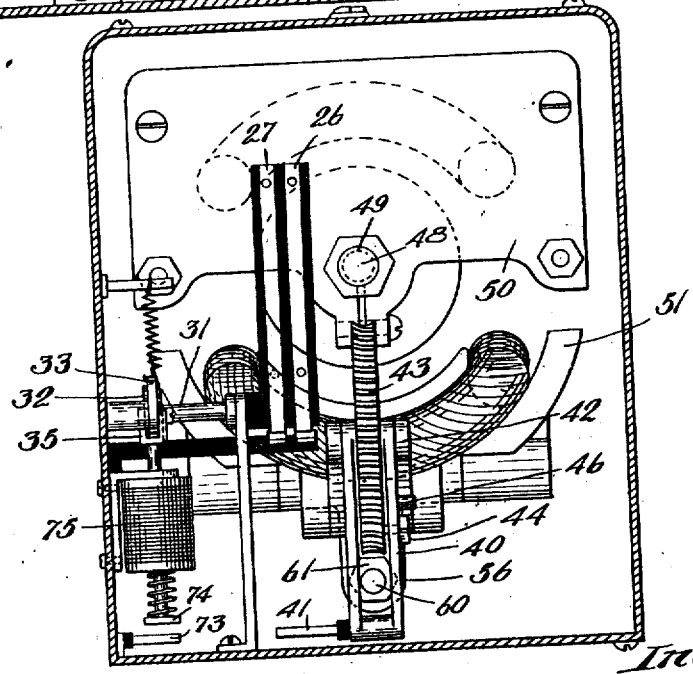
Fig. 2, is a left-hand elevation of the same, the inclosing case being shown in section.
Figure 3:
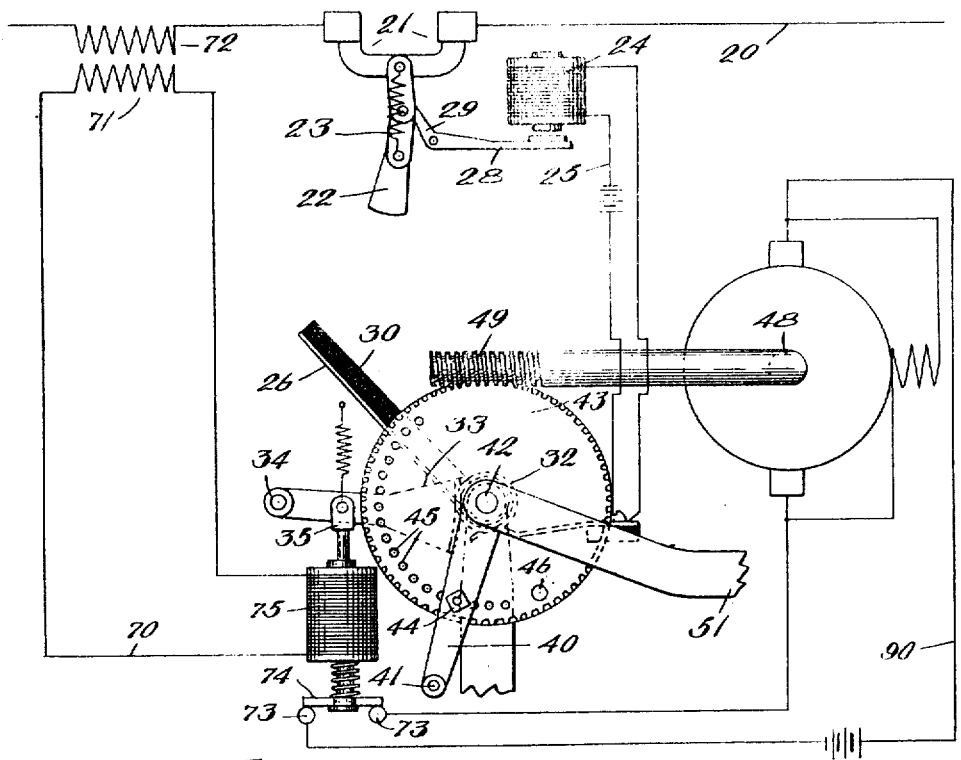
Fig. 3, is a diagrammatical view including parts of the aforesaid device and switch controlled by it and the circuits.
Figure 4:
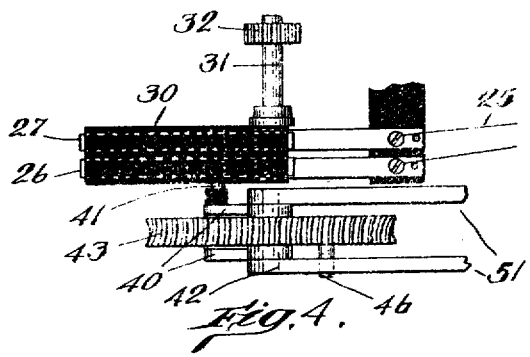
Fig. 4, is a plan view of the operating-device for the switch-controller.

Referring to Fig. 3 wherein a single line circuit is shown, as a simple manner of illustrating my invention, 20 represents the circuit or line-wire, and 21 a switch of any suitable construction, but preferably of a type adapted to be operated automatically to open the circuit, and manually to close the same. A snap-switch of usual construction is here shown having a hand-lever 22, and an actuating-spring 23. This is one form of switch which the time-limit controlling-device forming the subject-matter of this invention is designed to operate automatically to open the circuit 20. The time-limit controlling-device involves operating-means for the switch, and means responsive to an overload current to actuate it or to control its operation, and means also responsive to an overload current to adjust it, whereby the period of time required for it to operate the switch is reduced according to the strength or current value of the overload on overloads up to a predetermined current value, and is reduced definite periods of time on overloads of higher current values. As here shown for the purpose of illustrating my invention, said operating-means comprises a switch-controller of the electrical type, which is adapted, when operated, to open the switch, and an operating-device for the circuit, of said switch-controller which requires a prolonged period of time to complete its operation to operate the switch-controller, and said operating-device is automatically adjusted by means responsive to the overload current and is also actuated by means controlled by the overload current. The switch-controller here shown consists of an electromagnet 24, connected in a battery circuit 25, the armature of which is connected to a lever 28, secured to a pivot-shaft, and to said shaft is secured a short arm 29, which is designed to engage and operate the snap-switch to open the circuit 20 upon energization of the magnet. The operating-device for the switch-controller, as here shown, consists of a circuit controlling-device for the circuit 25, and said circuit controlling-device comprises two members, both of which are movable toward and from each other and one of them is time-controlled, so as to require a prolonged period of time to move and engage the other member. One of said circuit-closing members comprises two circuit-contacts 26, 27, adapted to be connected with the circuit 25, and said contacts are arranged on an arm 30, of insulating material, secured to a pivot-shaft 31, bearing a pinion 32, which is in mesh with the toothed sector 33, pivoted at 34, and connected by a link 35, with the armature of a solenoid 75, which armature is shown in Fig. 1, as in its normal elevated position, and in Fig. 3, as moved downward in response to the pull of the winding of the solenoid. Said solenoid is included in the circuit 70, of the secondary coil 71 of a transformer, the primary coil 72 of which is included in the circuit 20, so that said solenoid is responsive to an overload upon the circuit 20, which overload is reduced by or through the transformer. Said solenoid constitutes the means which is responsive to an overload current, and which is employed to adjust the operating-means for the switch by moving the circuit-closing member 26, 27, so as to vary its distance from the coöperating circuit-closing member according to the movement of the armature of the solenoid. On a light overload said circuit-closing member 26, 27, will be moved counter-clockwise a short distance, as shown in Fig. 3, and on a heavy overload will be moved a correspondingly greater distance, although it will be understood that movement of the core of the solenoid is checked when it arrives at or about the middle of the winding of the solenoid. The coöperating circuit-closing member of the circuit-closing device is time-controlled and consists of a yoke or arm 40, arranged to be moved rotarily in a vertical plane, having at its extremity a cross-piece or pin 41, which when the yoke or arm arrives at the end of its rotary movement is adapted to engage the circuit-contacts 26, 27, thereby to close the circuit 25 of the switch-controller. Said yoke or arm is mounted loosely on a shaft 42, to which a worm-wheel 43 is secured, and means, as a screw 44, is provided for adjustably connecting said yoke or arm with said worm-wheel in different radial positions, said screw entering any one of a series of holes 45, arranged in the side of said worm-wheel, so that the yoke or arm will be moved by said worm-wheel. Said worm-wheel also has a pin 46 projecting from its side which is adapted to engage a stop, here shown as a part of the field-frame of an electro-magnet, to thus determine its normal position or starting point, and said worm-wheel normally occupies this position regardless of the position of the yoke or arm relative thereto. As the worm-wheel is revolved in a clockwise direction, said yoke or arm is moved through an interval of space to engage the circuit-contacts 26, 27, which space is variable in length according to its connection with the worm-wheel, and the position of said contacts 26, 27, relative thereto. The movement of the worm-wheel and yoke or arm to close the circuit 25, of the switch requires a prolonged period of time, and such movement is controlled by means responsive to the overload, so that said circuit-closing member is controlled by the overload current. As a means to move the worm-wheel and the yoke or arm an electric-motor is here employed. The electric-motor here shown is an ordinary constant-speed motor connected in a battery circuit, which circuit is controlled by the overload current, although the motor is operated by a battery current. The armature 48 of the motor is supported in suitable bearings and one end of the shaft of the armature is extended as at 49, and is threaded to form a worm. The worm-wheel 43 is arranged beneath said worm, but is normally out of engagement therewith, and is supported by a movable member, whereby it is movable into and out of engagement with said worm. Said worm serves as the means to drive the worm-wheel and therefore constitutes the actuator for the operating-device. The engagement of the operating-device with its actuator is controlled by the current which operates the motor, and, herein, said worm-wheel 43 is supported by an extension of the lower part of the field-frame of the motor, which is made movable with respect to the upper part thereof, whereby the worm-wheel is moved into and out of engagement with its actuator. The field-frame of the motor is or may be made in two parts, or may have a movable part in connection with it, and, as here shown, said frame is divided on a horizontal line, 50 representing the upper part and 51 the lower part, and said parts are pivotally connected together at 52, so that the lower part is movable toward and from the upper part and the upper part is held stationary, being connected to the support 53. With the exception of making the field-frame in two parts, it may be constructed generally speaking, in any well known or suitable manner to support the field coils. Movement of the lower part 51, in a direction away from the upper part is limited by an adjustable yielding stop, comprising, as shown in Fig. 1, a pin 55, extended through an ear 56, arranged thereon, which engages a spring 57, resting against a fixed abutment 58, which may be a downward extension of the upper part. The lower end of the ear 56, has a hole through it for a bar 60, which is horizontally arranged and secured to the extension 58, and which projects through said hole for a considerable distance, and a spring 59 is arranged on said bar between the ear, and a nut 61 adjustably connected with the bar which exerts its pressure upon the ear in a direction to move the lower part of the frame downwardly, and upward movement of the frame acts to compress said spring, so that such movement is resisted by the spring, and by adjustment of the spring greater or less force may be required to lift the frame. The bar 60 may be calibrated, if desired, to indicate in amperes the force required to lift the frame by the magnetic influence due to the current traversing the coils of the motor and the motor acting as a magnet. Thus the spring 59 not only acts as a retractile spring to assist gravity in moving the part 51 away from the part 50, but also may be employed to determine the energy required to lift it, and hence serve as an adjusting-device for the motor, whereby it may be caused to move the operating-device into engagement with its actuator upon a current of a given value. When the lower part of the field-frame is in its lowermost position, being removed from or remote from the upper part, as represented in Fig. 1, said worm-wheel is removed from engagement with the worm, and when said lower part of the field-frame is in its uppermost position, as represented in Fig. 3, said worm-wheel is in engagement with the worm. The motor is arranged in the battery-circuit 90, which circuit is closed by the circuit-closing members 73, 74, controlled by the solenoid 75, so that upon the occurrence of an overload, said battery-circuit is closed and the motor is caused to operate at a constant speed to move the arm 40 clockwise at a constant speed, but the distance said arm moves is varied by means controlled by the solenoid 75. The constant-speed motor being included in the battery-circuit or driven by an independent source of electric energy, operates in conjunction with the solenoid 75 to operate the switch operating-means, but, as before stated, the solenoid 24 is responsive to overloads according to the current values thereof, up to a predetermined current value, and is definitely responsive to overloads of higher current values, so that the time of operation on light overloads will be variable according to their current values, and on heavy overloads will be definite. In this form of apparatus the chart lines will be indicated by inverse curves followed by straight lines, which will not intersect on heavy overloads. In Fig. 3, the plate 74 normally occupies a position above the contacts 73, as shown in Fig. 1, and will be moved downward into engagement with said contacts upon a downward movement of the core of the solenoid, and in view of the fact that engagement is required upon the occurrence of a light, as well as a heavy overload, said plate is loosely arranged on the stem connected with the core of the solenoid, and is held by the spring so that movement of the core of the solenoid, independently of the plate, is permitted upon the occurrence of heavy overloads, while the plate is in engagement with the contacts 73. Upon the occurrence of a light overload, the core will be moved a short distance sufficient to cause the plate 74 to engage the contacts, and the arm 30 will be moved counterclockwise a short distance only, as represented in Fig. 3, and upon the occurrence of a heavy overload the core of the solenoid will be moved farther, but the plate 74 will still engage said contacts 73, and will there remain while the core moves independently of it, although downward movement of the core is limited, as here shown, when it arrives at or about the middle of the solenoid, and will not be further moved regardless of the strength of the overload. In lieu of employing an electric-motor to operate the operating-means for the switch, any other suitable device may be employed, which is controlled by an overload current, and is arranged to operate said operating-means at a constant speed.

I claim:—

1. In a time-limit controlling-device for electric-switches, the combination of switch operating-means including contact-members requiring a prolonged period of time to operate the switch, means controlled by an overload current to adjust one of said members to variably reduce said period of time according to the current values of overloads up to a predetermined current value, and to definitely reduce said period of time on overloads of higher current values, and constant speed driving-means for the other member, substantially as described.

2. In a time-limit controlling-device for electric-switches, the combination of switch operating-means including contact-members requiring a prolonged period of time to operate the switch, means controlled by an overload current to adjust one of said members to variably reduce said period of time according to the current values of overloads up to a predetermined current value, and to definitely reduce said period of time on overloads of higher current values, and constant speed driving-means for the other member controlled by the overload current, substantially as described.

3. In a time-limit controlling-device for electric-switches, the combination of switch operating-means including contact-members, means controlled by an overload current to adjust one of said members to variably reduce said period of time according to the current values of overloads up to a predetermined current value, and to definitely reduce said period of time on overloads of higher current values, and an electric-motor controlled by an overload current and arranged to operate at a constant speed to operate the other member, substantially as described.

4. In a time-limit controlling-device for electric-switches, the combination of switch operating-means including contact-members requiring a prolonged period of time to operate the switch, means controlled by an overload current to adjust one of said members to variably reduce said period of time according to the current values of overloads up to a predetermined current value, and to definitely reduce said period of time on overloads of higher current values, an electric-motor controlled by an overload current and actuated by an independent source of electric energy and arranged to operate at a constant speed to operate the other member, substantially as described.

5. In a time-limit controlling-device for electric-switches, the combination of switch operating-means requiring a prolonged period of time to operate the switch including coöperating contact-members requiring a prolonged period of time to operate the switch, means controlled by an overload current to adjust one of said members to reduce said period of time according to the strength of the overload, and an electric-motor controlled by the overload current and actuated by an independent source of energy to actuate the other member, substantially as described.

6. In a time-limit controlling-device for electric-switches, the combination of switch-operating-means requiring a prolonged period of time to operate the switch including coöperating contact-members, a solenoid controlled by the overload current, and means operated by it to adjust one of said members to reduce said period of time according to the strength of the overload, and means controlled by the overload and operated by an independent source of electrical energy to actuate the other member, substantially as described.

7. In a selective time-limit controlling-device for electric-switches, the combination of switch-operating-means requiring a prolonged period of time to operate the switch including two contact-members, means to adjust one of said members to vary the length of said period of time, means controlled by an overload current to adjust the other member to reduce said period of time according to the strength of the overload, and means controlled by the overload current and operated by an independent source of electrical energy to actuate said first-named member, substantially as described.

8. In a time-limit controlling-device for electric-switches including a controller for the switch, an operating-device for said controller and two actuators operating conjointly to operate said operating-device, which require a prolonged period of time to operate said operating device, said actuators adapted to be set in motion upon the occurrence of an overload, one operated by an overload current variable distances according to the current value of the overload up to a predetermined current value, and definite distances on overloads of higher current values, and the other controlled by a separate source of electrical energy and moved at a constant speed, substantially as described.

9. A selective time-limit controlling-device for electric-switches including a controller for the switch and an operating-device for said controller, and two actuators operating conjointly to operate said operating-device, which requires a prolonged period of time to operate said operating device, said actuators adapted to be set in motion upon the occurrence of an overload, one of said actuators being operated by an overload current variable distances according to the current value of the overload up to a predetermined current value, and definite distances on overloads of higher current values, and the other controlled by a separate source of electrical energy and moved at a constant speed and also made adjustable for different settings, substantially as described.

10. A time-limit controlling-device for electric-switches including a definite time-controlled element, and an element which is variably controlled by an overload according to the current value up to a predetermined current value, and is definitely controlled by overloads of higher current values, said elements adapted for operation upon the occurrence of an overload coöperating to control the switch but requiring a prolonged period of time to operate the switch, substantially as described.

11. A time-limit controlling-device for electric-switches including a definite time-controlled element, controlled by an independent source of electrical energy and responsive to overload conditions, and means variably responsive to overloads according to the current values up to a predetermined current value and definitely responsive to overloads of higher current values for controlling said definite time-controlled element and for coöperating therewith to control the switch but requiring a prolonged period of time to operate said switch, substantially as described.

12. A time-limit controlling-device for electric-switches including a definite time-controlled element, and means variably responsive to overloads up to a predetermined current value, and definitely responsive to overloads of higher current values, said means coöperating with said element to control the switch but requiring a prolonged period of time to operate the switch and said means also controlling the operation of said element, substantially as described.

13. A time-limit controlling-device for electric-switches comprising a definite time-controlled element, a solenoid, and means operated by the solenoid controlling the operation of said element, said solenoid being variably responsive to overloads up to a predetermined current value, and definitely responsive to overloads of higher current values, and means also operated by said solenoid which coöperate with said element to control the operation of the switch, which requires a prolonged period of time to operate the switch, substantially as described.

14. A selective time-limit controlling-device for electric-switches including a definite time-controlled element, having means for adjusting it to consume periods of time of different length in operation, and an element which is variably controlled by an overload according to the current value up to a predetermined current value, and is definitely controlled on overloads of higher current values, said elements coöperating to control the switches but requiring a prolonged period of time, substantially as described.

In testimony whereof, I have signed my name to this specification in the presence of two subscribing witnesses.

GEORGE A. BURNHAM.

Witnesses:
H. W. CALDER,
E. C. WATERHOUSE.